United States Patent [19]
Gotou et al.

[11] Patent Number: 5,679,252
[45] Date of Patent: Oct. 21, 1997

[54] METHOD FOR PROCESSING ORGANIC WASTE WATER

[75] Inventors: Yasuyuki Gotou, Nagoya; Masumi Okamoto; Katsuhiro Suzuki, both of Kariya; Teruyuki Kanie, Nagoya; Itsuki Uchikawa, Aichi-gun; Takashi Nakagaki, Nagoya, all of Japan

[73] Assignee: Deconta Integre Co., Ltd., Nagoya, Japan

[21] Appl. No.: 249,320

[22] Filed: May 26, 1994

[30] Foreign Application Priority Data

May 31, 1993 [JP] Japan .................. 5-129077

[51] Int. Cl.$^6$ ........................................ G02F 3/06
[52] U.S. Cl. ........................... 210/614; 210/617
[58] Field of Search ..................... 210/617, 618, 210/614, 605, 630

[56] References Cited

U.S. PATENT DOCUMENTS

| | | | |
|---|---|---|---|
| 4,009,099 | 2/1977 | Jeris | 210/618 |
| 4,076,616 | 2/1978 | Verde | 210/618 |
| 4,177,144 | 12/1979 | Hickey et al. | 210/618 |

FOREIGN PATENT DOCUMENTS

| | | |
|---|---|---|
| 3-21394 | 1/1991 | Japan . |
| 4-250892 | 9/1992 | Japan . |
| 4-250893 | 9/1992 | Japan . |

*Primary Examiner*—Thomas G. Wyse
*Attorney, Agent, or Firm*—Lahive & Cockfield, LLP

[57] ABSTRACT

The present invention provides a high-performance organic waste water treating system which allows continuous processing of waste water without causing deterioration of the performance due to clogging of the filtration bed, excessive sludge, bad smell, or breeding of flies. The system of the invention includes a trickling filtration bed packed with filter media having a particle diameter of not greater than 10 mm, the filtration bed comprising an upper portion, a middle portion, and a lower portion, an air supply unit for feeding air from a bottom of the filtration bed to make the air flown through the filtration bed, and a vent pipe embedded into the middle portion of the filtration bed to connect to the atmosphere. A predetermined amount of organic waste water is abruptly supplied over a short time period into the trickling filtration bed at a predetermined cycle. Repetition of such abrupt supply of organic waste water into the system allows organic waste water to be processed efficiently without causing secondary products such as a microbial membrane or sludge.

6 Claims, 7 Drawing Sheets

BACTERIA MULTIPLICATION CURVE

A : LAG PHASE
B : LOGARITHMIC PHASE (EXPONENTIAL PHASE)
C : STATIONARY PHASE
D : DEATH PHASE

METHOD FOR PROCESSING ORGANIC WASTE WATER

BACKGROUND OF THE INVENTION

1. Field of the Invention

The present invention relates to a novel technique of processing and purifying industrial and municipal organic waste water by utilizing digestive and degradable actions of microorganisms. The organic waste water processed herein generally has the water content of not less than 98%. When organic substances included in the waste water have high solubility like sugar, however, the water content may be approximately 95%.

2. Description of the Related Art

Known methods of biologically processing organic waste water include aerobic processes such as an activated sludge process, a biological membrane process, and a stabilization pond process, and anaerobic processes such as a digestive process.

The conventional biological membrane process brings a biological filter membrane formed on the surface of a solid base in contact with organic waste water to process sludge in the waste water. A typical example of the biological membrane process is a trickling filtration system.

Continuous supply of oxygen is required to enhance the actions of aerobic microorganisms and thereby to maintain the sufficient processing ability of a trickling filtration bed. Insufficient supply of oxygen makes anaerobic microorganisms dominant in the filtration bed to significantly deteriorate the processing ability of the filtration bed.

Examples of typical filter media used for the trickling filtration bed include crushed igneous rocks such as andesite or granite, coal, cokes, and mineral residues. The filter medium should have a rough surface for preventing unintentional peel-off of the biological membrane and a particle diameter of not less than 30 mm for preventing clogging or interference in smooth air feeding.

In the conventional trickling filtration system, the process loading (BOD loading) is 0.7 through 2.1 Kg/m$^2$ day, and the rate of BOD (biochemical oxygen demand) removal is 60 through 80% with a final settling tank and at most 50% without a final settling tank.

The disadvantages of conventional filtration trickling system includes the creation of unwanted stenches and the breeding of flies in the filtration bed. Moreover, conventional trickling systems can not effectively process or purify organic waste water having the BOD concentration three or more times the final BOD concentration required for processed water. The activated sludge process has better processing performance but has other disadvantages such as high processing cost or excessive sludge.

SUMMARY OF THE INVENTION

The object of the present invention is thus to provide a high-performance organic waste water treating system which allows for the continuous processing of waste water without causing a deterioration in the system performance due to unwanted clogging of the filtration bed, excessive sludge, stenches, or breeding of flies.

FIG. 1 shows the multiplication curve of bacteria, with the cultivation time as the abscissa and the logarithmic viable cell count as the ordinate. The multiplication cycle of bacteria include the following four phases:

(1) Lag phase: Bacteria inoculated in a new culture medium do not immediately start multiplication. The lag phase corresponds to a period of preparation for multiplication, during which the metabolic action of bacteria is enhanced to increase the size of bacterial cells while not significantly increasing the number of bacterial cells.

(2) Logarithmic (Exponential) phase: Bacterial cells start fission and are abruptly multiplied. In the logarithmic phase, the number of bacterial cells increases exponentially, and the generation time is kept constant.

(3) Stationary phase: The vial cell count reaches its maximum. Deficiency in nutrients and the accumulation of metabolites prevents the further multiplication of bacteria.

(4) Death phase: The vial cell count gradually decreases with death of bacterial cells.

The inventors have noted that positive utilization of the bacterial actions in the lag phase effectively prevents sludge and clogging of the filtration bed without causing a large number of dead microbial cells. The inventors have also noted that abrupt environmental change in the lag phase gives a certain stress to microorganisms to limit the transient to the subsequent exponential phase.

In a three-meter filtration bed filled with filter media of less than 10 mm in diameter, approximately 80% of the lower portion of the filtration bed was under the conditions of oxygen deficiency, which caused multiplication of anaerobic microorganisms and facultative anaerobes.

The periodic application of environmental stresses into this filtration bed restricts the multiplication of the anaerobic microorganisms or facultative anaerobes, especially multiplication of flock-inducible large microorganisms. The application of an environmental stress also effectively prevented clogging of the filtration bed.

While the air was fed from the bottom of the filtration bed, oxygen deficiency in the upper portion of the filtration bed increased the BOD removal rate to 90% or greater. The rate of BOD removal was equal to or greater than 95% in a filtration bed packed with wood chips in its upper portion and with active carbon in its lower portion. The rate of BOD removal was improved to 97% or greater by embedding a vent tube in the filtration bed and decreasing the oxygen amount in the upper portion of the filtration bed. Filter media of smaller diameters further improved the BOD removal rate to 99.9%. In any case, the process loading or BOD loading per day was 2.8 through 3 Kg/m$^2$ day.

The period of the lag phase of microorganisms is known to be approximately four hours. Since microorganisms gradually increase with the elapse of time, however, it is preferable to determine a shorter cycle for application of an environmental stress.

Supply conditions of organic waste water into a processing system are determined in the following manner.

The length of the lag phase is varied depending upon the intensity of the environmental stress applied; that is, the shorter lag phase under the weaker stress.

The inventors have accordingly set the cycle time of applying an environmental stress equal to one hour.

When an organic waste water processing system has the BOD loading of 3 Kg/m$^2$ day, approximately 1000 Kg=1000 m$^3$ of organic waste water having the BOD concentration of 3,000 ppm can be processed per day (3 Kg/3,000 ppm). Since the cycle time is set equal to one hour, the amount of waste water supplied to the system is 41.7 liters/m$^2$ time (1 m$^3$/24=41.7 liter/hour).

When the amount of waste water supplied into the system is greater than the amount of waste water trickling out of the filtration bed, waste water existing in the filter media is diluted more effectively. The higher rate of waste water supply is thereby preferable; for example, greater than the rate of 0.2 liter/second m² of the filtration bed.

The amount of waste water supply may be determined according to the volume of the filtration bed. When the height of the filtration bed is two meters, the amount of water supply is 20.8 liters/m³ hour. When water without organic substances was supplied at the rate of 50 liters/m² at every one hour, the flow running out of the bottom of the two-meter filtration bed had a peak in a time period of 15 through 20 minutes after the water supply (see FIG. 2).

The results of similar measurement for organic waste water showed that the flow had a peak in a time period of 25 through 30 minutes after the water supply. The preferable cycle time for preventing excessive water in the filtration bed is thereby greater than 30 minutes.

According to the above results, the cycle time of waste water supply should be longer than the peak time of water flow trickling through the filtration bed and shorter than the time when the multiplication cycle of microorganisms transits from the lag phase to the exponential phase. The preferable cycle is generally thirty minutes through one hour.

After supply of organic waste water into the filtration bed, small microorganisms having a size corresponding to the detection limit of a light microscope start abrupt multiplication. These small microorganisms, however, do not form flocks which cause clogging of the filtration bed.

The present invention is directed to a novel method of processing organic waste water and an organic waste water processing system developed according to the results described above.

The method of the invention includes the steps of:

preparing a trickling filtration system comprising a filtration bed packed with filter media having a particle diameter of not greater than 10 mm;

determining an amount of waste water supply per area or volume of the filtration bed according to a concentration and properties of an organic content included in the organic waste water;

determining a cycle of the waste water supply, the cycle being shorter than a period of a lag phase in a multiplication cycle of flock-inducible microorganisms but sufficiently long for utilizing metabolism of the microorganisms; and repeating abrupt but short-time supply of the predetermined amount of the organic waste water into the filtration bed of the trickling filtration system at the predetermined cycle so as to process the organic waste water without causing secondary products such as a microbial membrane or sludge.

The method may further include the step of feeding air from a bottom of the filtration bed packed with the filter media of not greater than 10 mm in diameter to make the air flown through the filtration bed. The air feeding step further includes the step of making an amount of air feeding in an upper portion of the filtration bed less than an amount of air feeding in a lower portion of the filtration bed.

It is preferable that the upper portion of the filtration bed is packed with wood chips and the lower portion of the filtration bed is packed with active carbon.

The invention is also directed to an organic waste water processing system, which includes a trickling filtration bed packed with filter media having a particle diameter of not greater than 10 mm, the filtration bed comprising an upper portion, a middle portion, and a lower portion;

air supply means for feeding air from a bottom of the filtration bed to make the air flown through the filtration bed; and vent means embedded into the middle portion of the filtration bed to connect to the atmosphere.

It is preferable that the upper portion of the filtration bed is packed with wood chips and the lower portion of the filtration bed is packed with active carbon.

The organic waste water processing system may further include a control mechanism having a timer and a constant discharge pump for controlling supply of organic waste water into the trickling filtration bed.

Abrupt supply of organic waste water into the filtration bed decreases the concentration of the organic content in the filtration bed to cause a drastic decrease in nutrients for microorganisms. This environmental stress on the microorganisms prevents exponential multiplication and thereby formation of flocks of the microorganisms.

As the filtration proceeds in the filtration bed, the concentration of the organic content functioning as a nutritious base gradually increases to enhance metabolism of microorganisms similar to a lag phase in a multiplication cycle of the microorganisms.

In the method and system of the invention, a predetermined amount of organic waste water is abruptly supplied over a short time period into the trickling filtration bed at a predetermined cycle. Repetition of such abrupt supply of organic waste water into the system allows organic waste water to be processed efficiently without causing the formation of secondary products, such as the formation of a microbial membrane or sludge. The amount of waste water supplied per area or volume of the filtration bed is determined according to a concentration and properties of an organic content included in the organic waste water. The cycle of the waste water supply is determined to be shorter than a period of the lag phase in the multiplication cycle of flock-inducible microorganisms but sufficiently long for utilizing metabolism of the microorganisms.

The vent means makes the amount of air feeding in the upper portion of the filtration bed less than the amount of air feeding in the lower portion of the filtration bed. This makes the upper portion of the filtration bed deficient in oxygen, thus enhancing activities of anaerobic microorganisms and facultative anaerobes to accelerate degradation of the organic content in the filtration bed to lower organic substances. Most of the lower organic substances are soluble in water to be successively flown out by a subsequent supply of organic waste water. The lower organic substances easily move to the lower portion of the filtration bed.

Anaerobic fermentation goes through an acid generating phase, an acid decreasing phase, and a final degradation phase. When the filtration bed is packed with filter media sieved with a screen of 1.5 through 4 mm mesh, the anaerobic microorganisms and facultative anaerobes are flown out of the filtration bed in the acid decreasing phase. This significantly reduces the total amount of ill-smelling gas, that is, methane and ammonia gas, generated in the final degradation phase. Sufficient oxygen in the lower portion of the filtration bed accelerates the activities of aerobic microorganisms to oxidize the lower organic substances to carbon dioxide, water, and a small amount of salts.

These and other objects, features, aspects, and advantages of the present invention will become more apparent from the following detailed description of the preferred embodiments with the accompanying drawings.

DESCRIPTION OF THE PREFERRED EMBODIMENT

Organic waste water processing systems according to the method of the invention are described hereafter based on the drawings.

Figure 1:
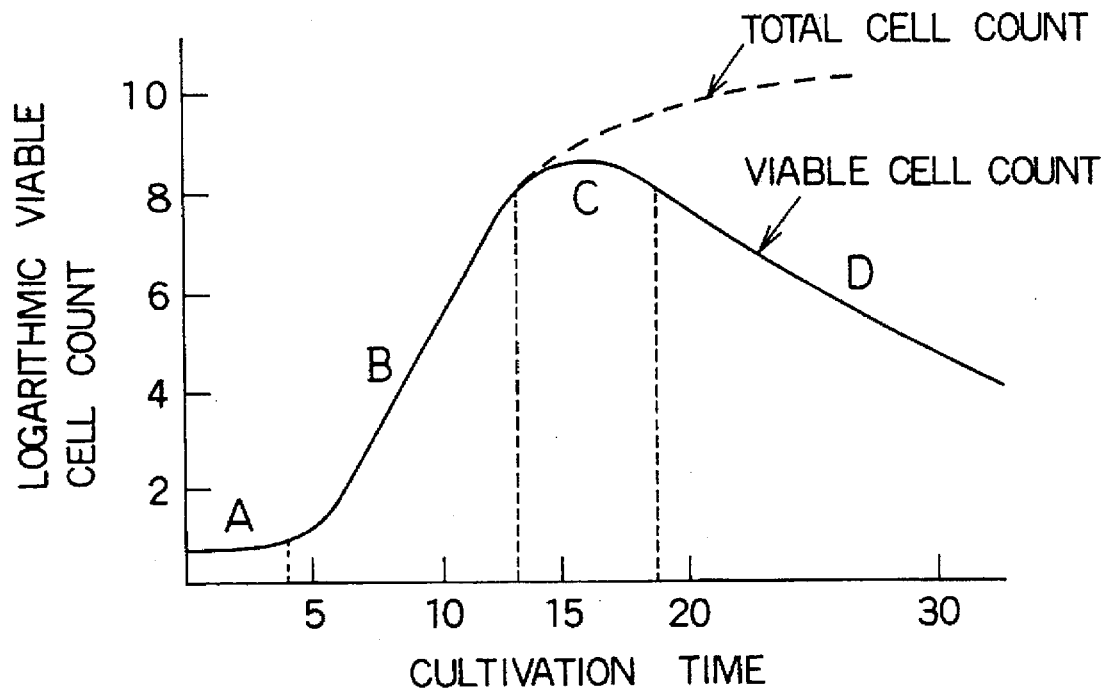
FIG. 1 is a graph showing the multiplication curve of bacteria, with the cultivation time as abscissa and the logarithmic viable cell count as ordinate.
Figure 2:
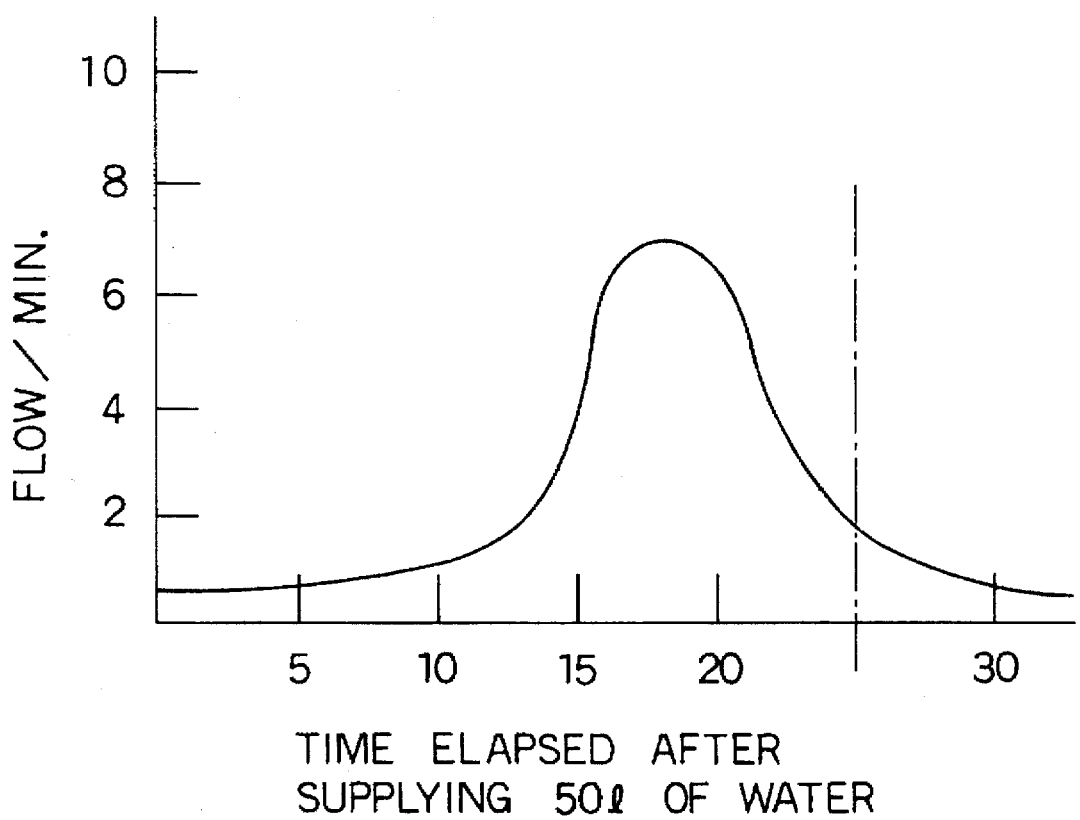
FIG. 2 is a graph showing the time course of discharge amount.
Figure 3:
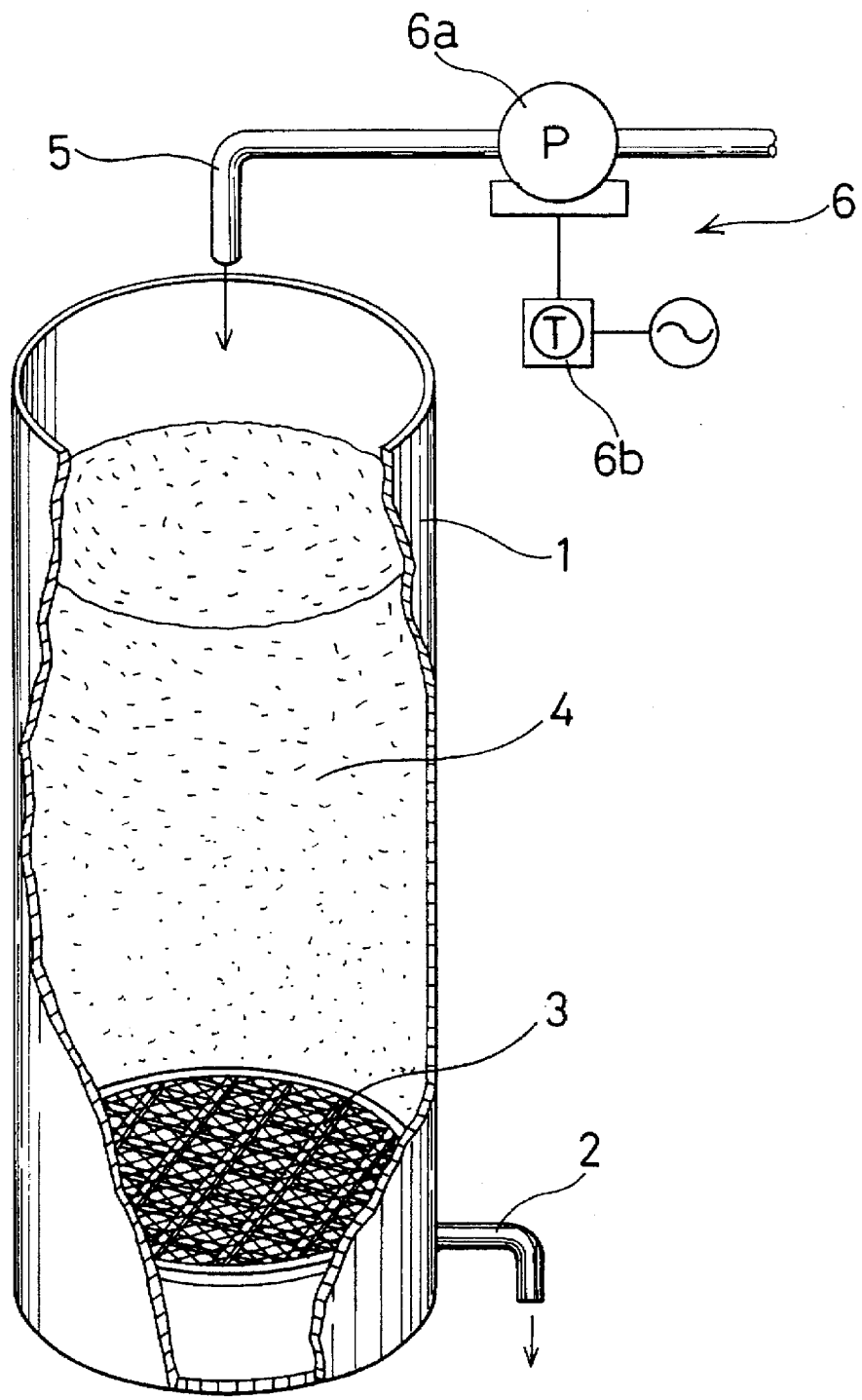
FIG. 3 shows an organic waste water processing system as a first embodiment according to the invention.

FIG. 3 shows an organic waste water processing system as a first embodiment of the invention. A cylindrical open-top filtration tank 1 (height: 2.8 m, diameter: 1.13 m) is provided with a discharge outlet 2' on the bottom thereof. A stainless mesh plate 3 (16 mesh) is spanned at a height of approximately 10 cm from the bottom of the tank 1. The filtration tank 1 is packed with wood chips 4 of 1.5 through 4.5 mm in diameter used as a filter medium. The wood chips 4 are charged above the mesh plate 3 to the height of approximately 2.4 m in the filtration tank 1 to form a trickling filtration bed.

A waste water supply conduit 5 connected to an organic waste water tank (not shown) is placed immediately above the filtration tank 1 to supply waste water into the filtration tank 1. The waste water supply conduit 5 is further provided with a control mechanism 6, which includes a constant delivery pump 6a and a timer 6b and controls supply of organic waste water.

In the organic waste water processing system thus constructed, industrial waste water of 45 liters was abruptly supplied through the waste water supply conduit 5 over five minutes. This process was repeated at every one hour. The timing of waste water supply was automatically determined according to a preset value on the timer 6b. The industrial waste water used was discharge from a bakery.

Table 1 shows the results of measurements of pH, BOD (biochemical oxygen demand), COD (chemical oxygen demand), and the water temperature.

|  | pH | BOD | COD | WATER TEMP. |
| --- | --- | --- | --- | --- |
| WASTE WATER | 5.0 | 3000 ppm | 1500 ppm | 25° C. |
| WATER PROCESSED | 6.8 | 300 ppm | 80 ppm | 25° C. |

Six-month continuous operation of the processing system did not cause significant deterioration of its performance nor undesirable clogging of the filtration bed.

In the above measurement, the process loading (BOD loading) was 3.0 kg/m² day, and the BOD removal rate was more than 90%.

Figure 4:
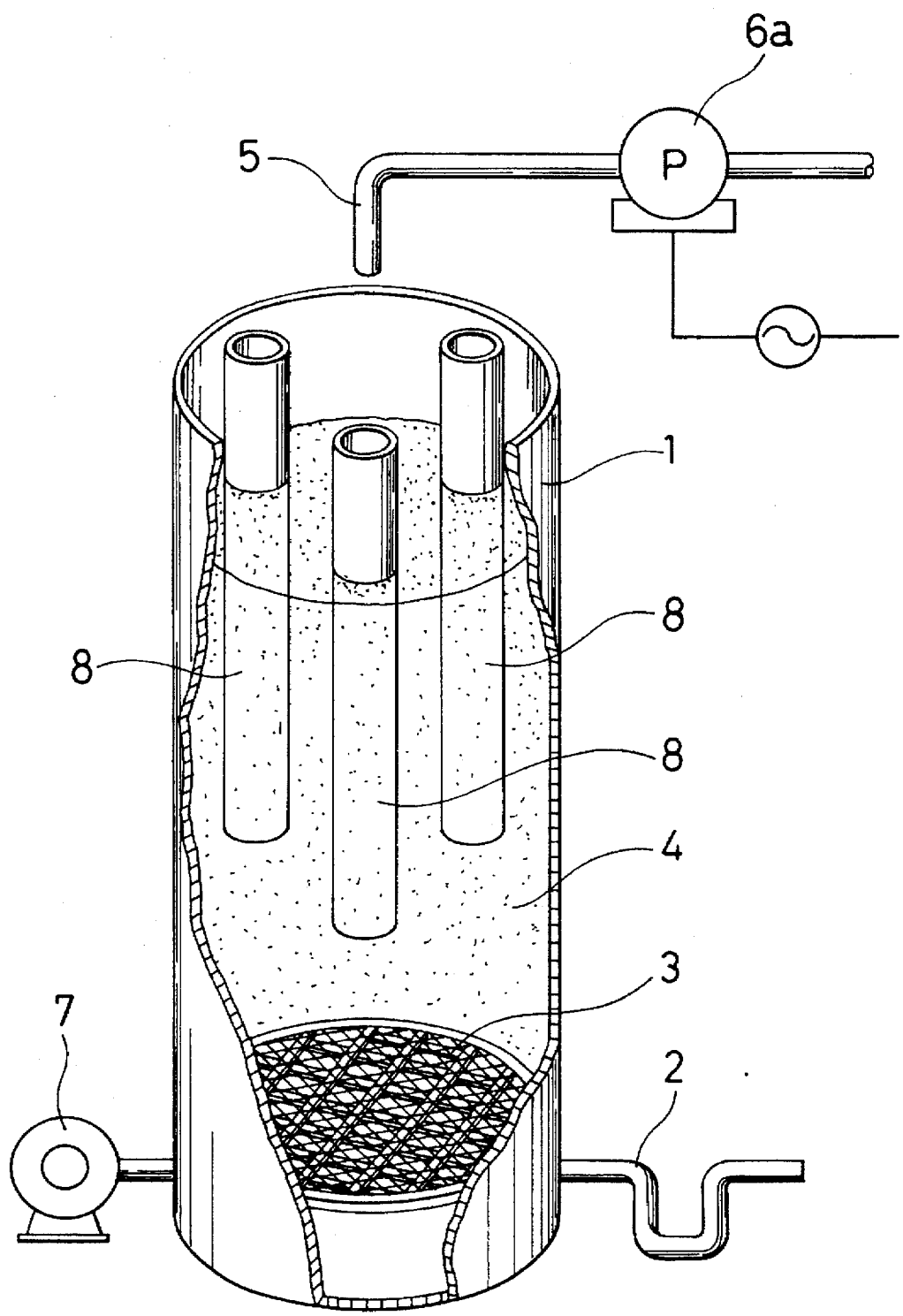
FIG. 4 shows another organic waste water processing system as a second embodiment according to the invention.

FIG. 4 shows another organic waste water processing system as a second embodiment of the invention, which does not include the control mechanism of the first embodiment but has an air feeding mechanism. Elements of the second embodiment identical with those of the first embodiment are shown by the like numerals and not explained here.

In the system of the second embodiment, an air supply opening of a blower 7 is connected to the lower portion of the filtration tank 1. A discharge outlet 2 is formed to have a seal pot structure, which prevents the air fed from the blower 7 from being leaked through the discharge outlet 2 but allows all the air to move upward to pass through the filter medium.

Three vinyl chloride pipes 8 of 10 cm in diameter are embedded in the wood chips 4 to the depth of approximately 1.6 m in the filtration tank 1. Since the most air flows into the vinyl chloride pipes 8, the amount of the air in an upper portion of the filtration bed is significantly decreased.

In the organic waste water processing system thus constructed, while the air of 36 m/m Aq was continuously fed with a 0.1 KW motor, organic waste water was supplied at the rate of 45 liters/one hour by means of the constant delivery pump 6a over two weeks. Such continuous supply of organic waste water caused clogging in the filtration bed, which was eliminated by stopping the supply of waste water for three or four days. The same procedures including two-week continuous operation with three or four-day interruption were then repeated over three months.

The organic waste water processing system of the second embodiment does not include the control mechanism using the timer, and start or stop of the water supply is thereby performed manually.

Table 2 shows the results of measurements of pH, BOD (biochemical oxygen demand), COD (chemical oxygen demand), and the water temperature.

|  | pH | BOD | COD | WATER TEMP. |
| --- | --- | --- | --- | --- |
| WASTE WATER | 5.0 | 3000 ppm | 1500 ppm | 25° C. |
| WATER PROCESSED | 7.6 | 150 ppm | 50 ppm | 15° C. |

The system of the second embodiment is constructed to feed the air from the bottom of the trickling filtration bed and to decrease the amount of air feeding in the upper portion of the filtration bed compared with that in the lower portion of the filtration bed. This makes the environment in the upper anaerobic portion of the filtration bed suitable for anaerobic microorganisms and the environment in the lower portion of the filtration bed suitable for aerobic microorganisms, thereby further improving the systems ability to process waste water.

As described previously, three-day interruption is required after two-week continuous operation for processing organic waste water. Simultaneous operation of a plurality of such systems with different interruption cycles allows continuous processing of organic waste water. The three-day interruption out of seventeen days corresponds to reduction of the BOD loading to 82.3%. In the above measurement, the BOD loading was 2.4 kg/m² day, and the BOD removal rate was approximately 95%.

Figure 5:
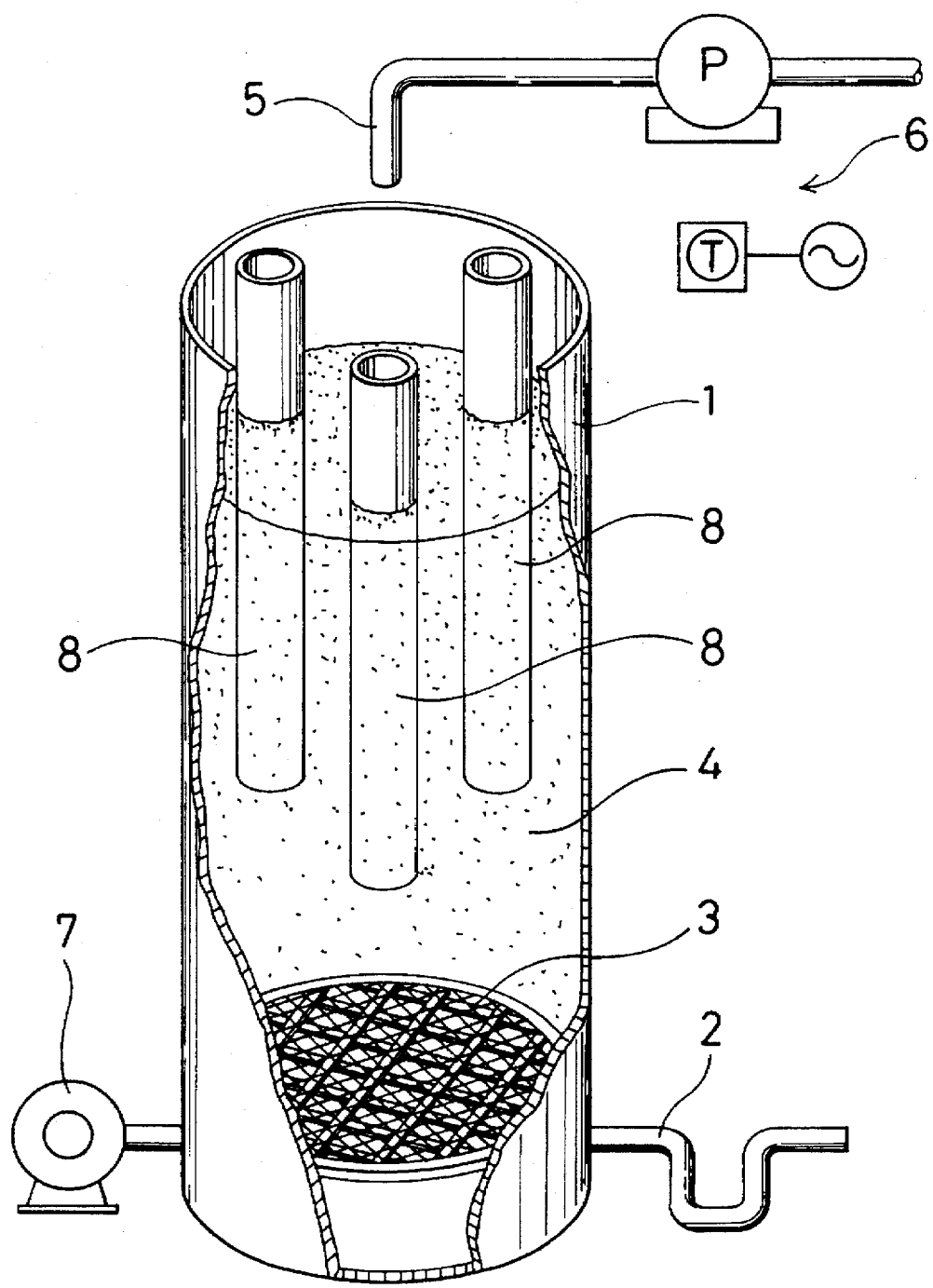
FIG. 5 shows still another organic waste water processing system as a third embodiment according to the invention.

FIG. 5 shows still another organic waste water processing system as a third embodiment of the invention. The system of the third embodiment includes both the control mechanism of the first embodiment and the air feeding mechanism of the second embodiment. An air supply opening of a blower 7 is connected to the lower portion of a filtration tank 1. Three vinyl chloride pipes 8 of 10 cm in diameter are embedded in wood chips 4 to the depth of approximately 1.6 m in the filtration tank 1.

In the organic waste water processing system thus constructed, while the air of 36 m/m Aq was continuously fed through the blower 7 with a 0.1 KW motor, industrial waste water of 45 liters was abruptly supplied over three minutes by means of a control mechanism 6. This process was repeated at every one hour.

Table 3 shows the results of measurements of pH, BOD (biochemical oxygen demand), COD (chemical oxygen demand), and the water temperature.

|  | pH | BOD | COD | WATER TEMP. |
|---|---|---|---|---|
| WASTE WATER | 5.0 | 3000 ppm | 1500 ppm | 25° C. |
| WATER PROCESSED | 7.6 | 75 ppm | 40 ppm | 17° C. |

Six-month continuous operation of the processing system did not cause significant deterioration of its performance nor undesirable clogging of the filtration bed. In the above measurement, the process loading (BOD loading) was 3.0 $kg/m^2$ day, and the BOD removal rate was approximately 97.5%.

Figure 6:
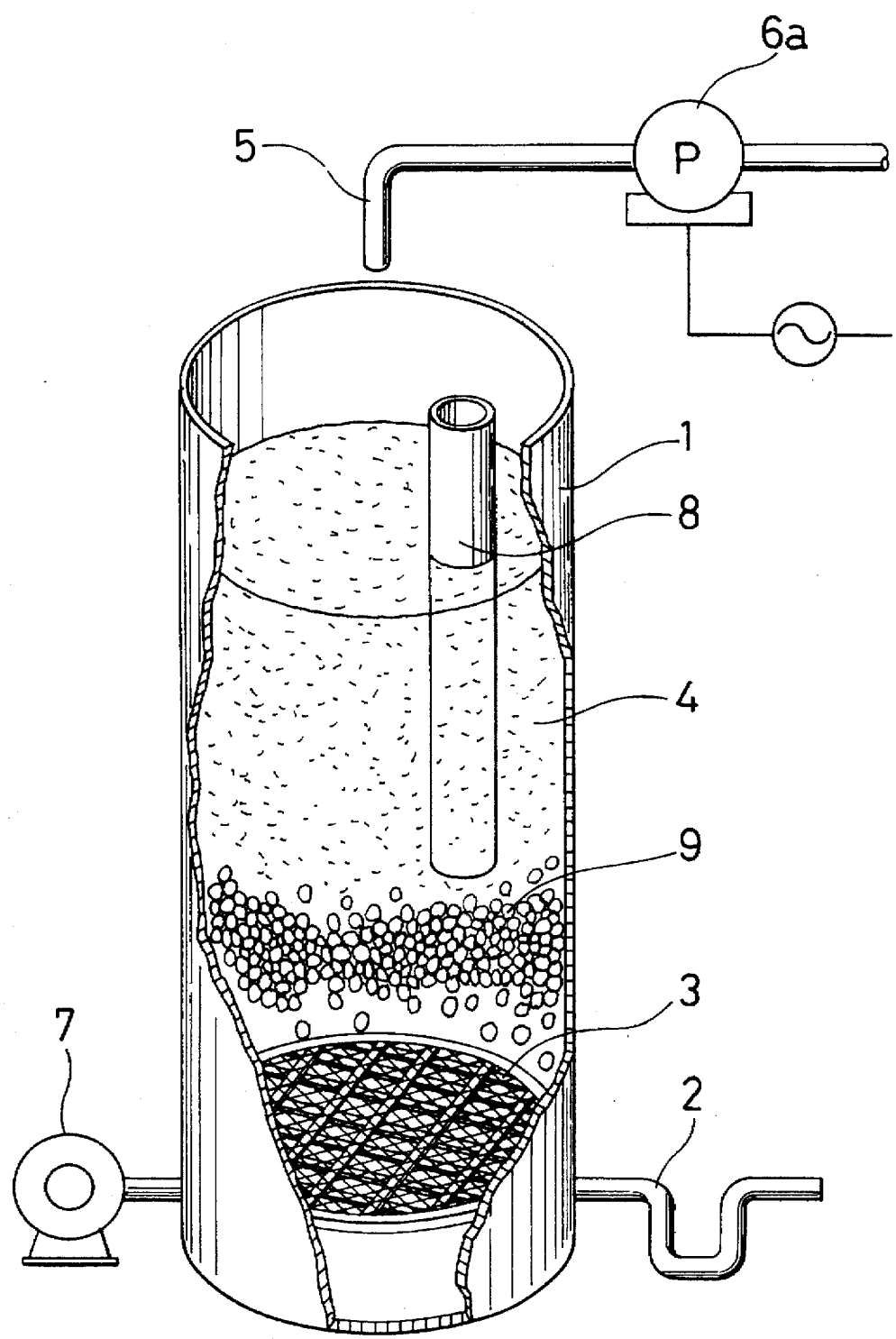
FIG. 6 shows another organic waste water processing system as a fourth embodiment according to the invention.

FIG. 6 shows another organic waste water processing system as a fourth embodiment according to the invention. The system of the fourth embodiment is similar to that of the second embodiment, except that the wood chips 4 are replaced by active carbon 9 in a lower 50 cm portion of the filtration bed and that only one viny chloride pipe 8 is embedded to the depth of the active carbon 9 in the filtration bed.

Table 4 shows the results of measurements of pH, BOD (biochemical oxygen demand), COD (chemical oxygen demand), and the water temperature.

|  | pH | BOD | COD | WATER TEMP. |
|---|---|---|---|---|
| WASTE WATER | 5.0 | 3000 ppm | 1500 ppm | 25° C. |
| WATER PROCESSED | 7.5 | 6 ppm | 9 ppm | 16° C. |

Four-week continuous operation of the system caused clogging in the filtration bed, which was eliminated by stopping the supply of waste water for four days. The same procedures including four-week continuous operation with four-day interruption were then repeated over six months. Simultaneous operation of a plurality of such systems with different interruption cycles allows continuous processing of organic waste water, like the system of the second embodiment. The four-day interruption out of thirty two days corresponds to reduction of the BOD loading to 87.5%. In the above measurement, the BOD loading was 2.62 $kg/m^2$ day, and the BOD removal rate was approximately 99.8%.

Figure 7:
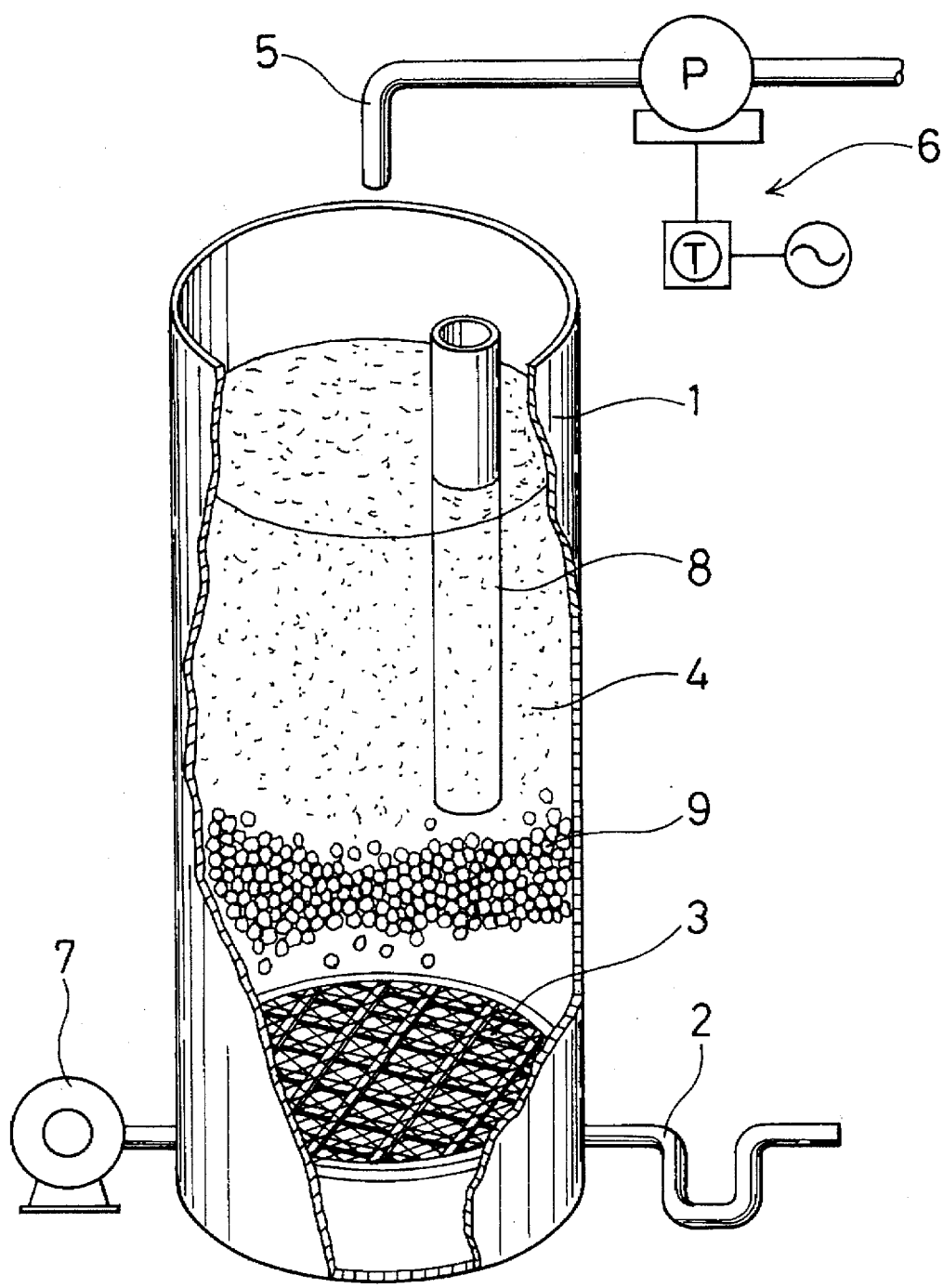
FIG. 7 shows still another organic waste water processing system as a fifth embodiment according to the invention.

FIG. 7 shows still another organic waste water processing system as a fifth embodiment according to the invention. The system of the fifth embodiment is similar to that of the third embodiment, except that the wood chips 4 are replaced by active carbon 9 of 1 through 3 mm in diameter in a lower 50 cm portion of the filtration bed and that only one viny chloride pipe 8 is embedded to the depth of the active carbon 9 in the filtration bed.

Table 5 shows the results of measurements of pH, BOD (biochemical oxygen demand), COD (chemical oxygen demand), and the water temperature.

|  | pH | BOD | COD | WATER TEMP. |
|---|---|---|---|---|
| WASTE WATER | 5.0 | 3000 ppm | 1500 ppm | 25° C. |
| WATER PROCESSED | 7.8 | 3 ppm | 8 ppm | 16° C. |

Six-month continuous operation of the processing system did not cause significant deterioration of its performance nor undesirable clogging of the filtration bed. In the above measurement, the process loading (BOD loading) was 3.0 $kg/m^2$ day, and the BOD removal rate was approximately 99.9%.

Bad smell or breeding of flies has not been observed in any system of the embodiments.

In the second through the fifth embodiments described above, the desirable process loading is maintained by keeping the temperature of air feeding at approximately 20° C. When the room temperature becomes lower than 20° C., for example, in winter time, it is preferable to heat the air to approximately 20° C.

When wood chips in the filtration bed are not completely seasoned, the air fed into the wood chips may cause elution of lignin, which gives a color to processed water. Active carbon used as a filter medium in the lower portion of the filtration bed effectively prevents elution of lignin. When high-performance processing of waste water is not required, clinker ash particles or porous ceramic particles may be used instead of active carbon. Active carbon is, however, most preferable for stable and efficient processing of waste water.

In the organic waste water processing system of the invention, the air is fed in a direction opposite to the direction of waste water flow while the amount of air feeding in the upper portion of the filtration bed is made less than that in the lower portion of the filtration bed. This effectively restricts the exponential growth of microorganisms, and efficiently processes organic waste water by utilizing the characteristics of the lag phase in a multiplication cycle of microorganisms. The system of the invention allows continuous processing of organic waste water without causing deterioration of the performance due to clogging of the filtration bed, excessive sludge, bad smell, or breeding of flies, thus realizing economical and practical operation.

Although one or a plurality of vinyl chloride pipes of 10 cm in diameter are embedded in the filtration bed to make the amount of air feeding in the upper portion of the filtration bed less than that in the lower portion of the filtration bed in the second through fifth embodiments described above, these pipes may be made of a different material. Instead of such pipes, a forcible air exhaust mechanism for forcibly discharging the air may be disposed on the boundary between the upper portion and the lower portion of the filtration bed. The filter medium may be any other material having the function of carrying microorganisms.

There may be many other modifications, alternations, and changes without departing from the scope or spirit of essential characteristics of the invention. It is thus clearly understood that the above embodiments are only illustrative and not restrictive in any sense. The scope and spirit of the present invention are limited only by the terms of the appended claims.

What is claimed is:

1. A method of processing organic waste water, said method comprising the steps of:

providing a trickling filtration system having a filtration bed packed with filter media having a particle diameter of not greater than 10 mm;

determining an appropriate amount of waste water to be supplied to said filtration bed according to a concentration and properties of an organic content included in said organic waste water;

determining a cycle of said waste water supply, said cycle being shorter than a period of a lag phase in a multiplication cycle of flock-inducible microorganisms but being sufficiently long for utilizing metabolism of said microorganisms; and repeatedly supplying said predetermined amount of said organic waste water into said filtration bed of said trickling filtration system at said predetermined cycle so as to process said organic waste water without producing secondary products.

2. A method in accordance with claim 1, wherein said organic waste water is supplied into said filtration bed of said trickling filtration system at a rate greater than 0.2 liter per second for every square meter of said filtration bed.

3. A method in accordance with claim 1, said method further comprising the step of:

feeding air from a bottom of said filtration bed packed with said filter media and up through said filtration bed.

4. A method in accordance with claim 3, wherein said air feeding step further comprises the step of:

making an amount of air feeding into an upper portion of said filtration bed less than an amount of air feeding into a lower portion of said filtration bed.

5. A method in accordance with claim 4, wherein said upper portion of said filtration bed is packed with wood chips and said lower portion of said filtration bed is packed with active carbon.

6. A method in accordance with claim 3, wherein said air feeding step includes the step of forming a top anaerobic section in said filtration bed and a bottom aerobic section in said filtration bed.

* * * * *